J. S. WILLIAMS.
FLOATABLE CONCRETE CONSTRUCTION.
APPLICATION FILED MAR. 3, 1909.
1,310,461.
Patented July 22, 1919.
11 SHEETS—SHEET 4.
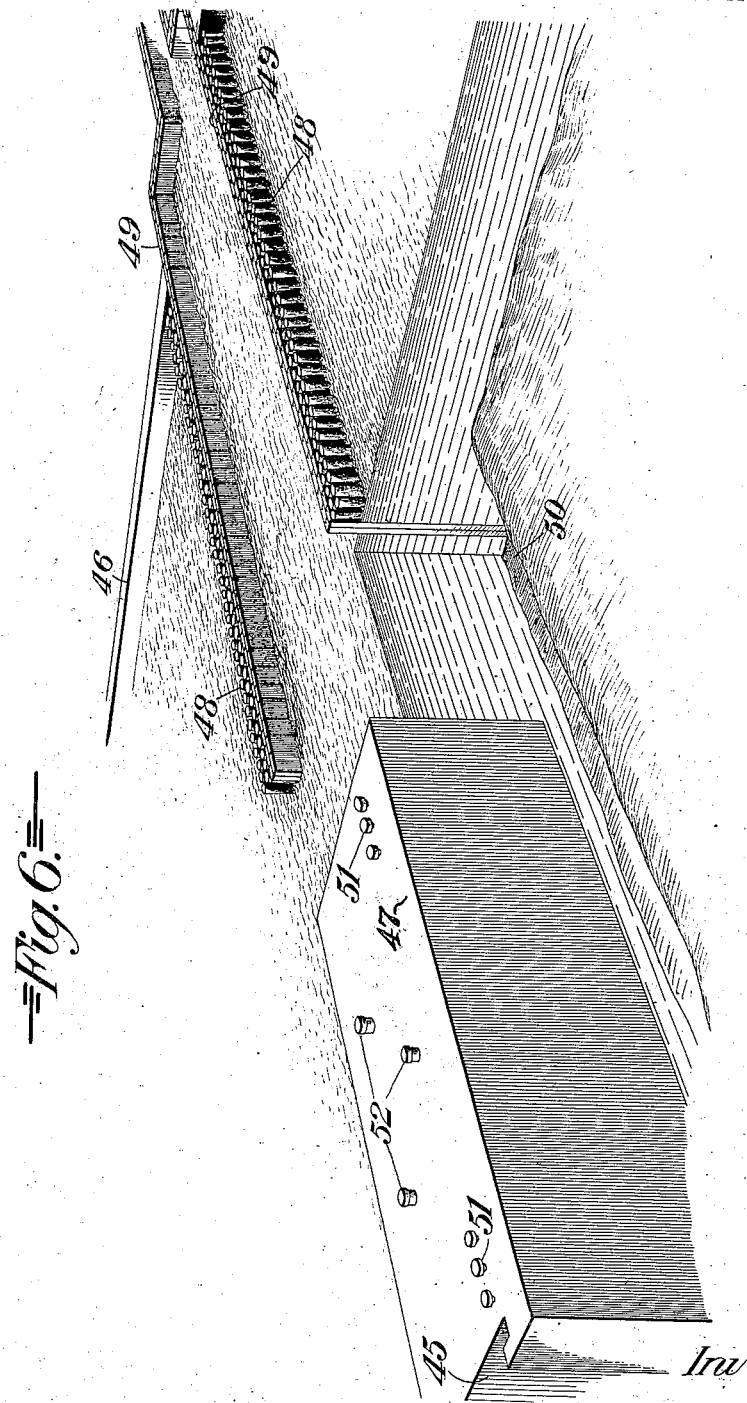

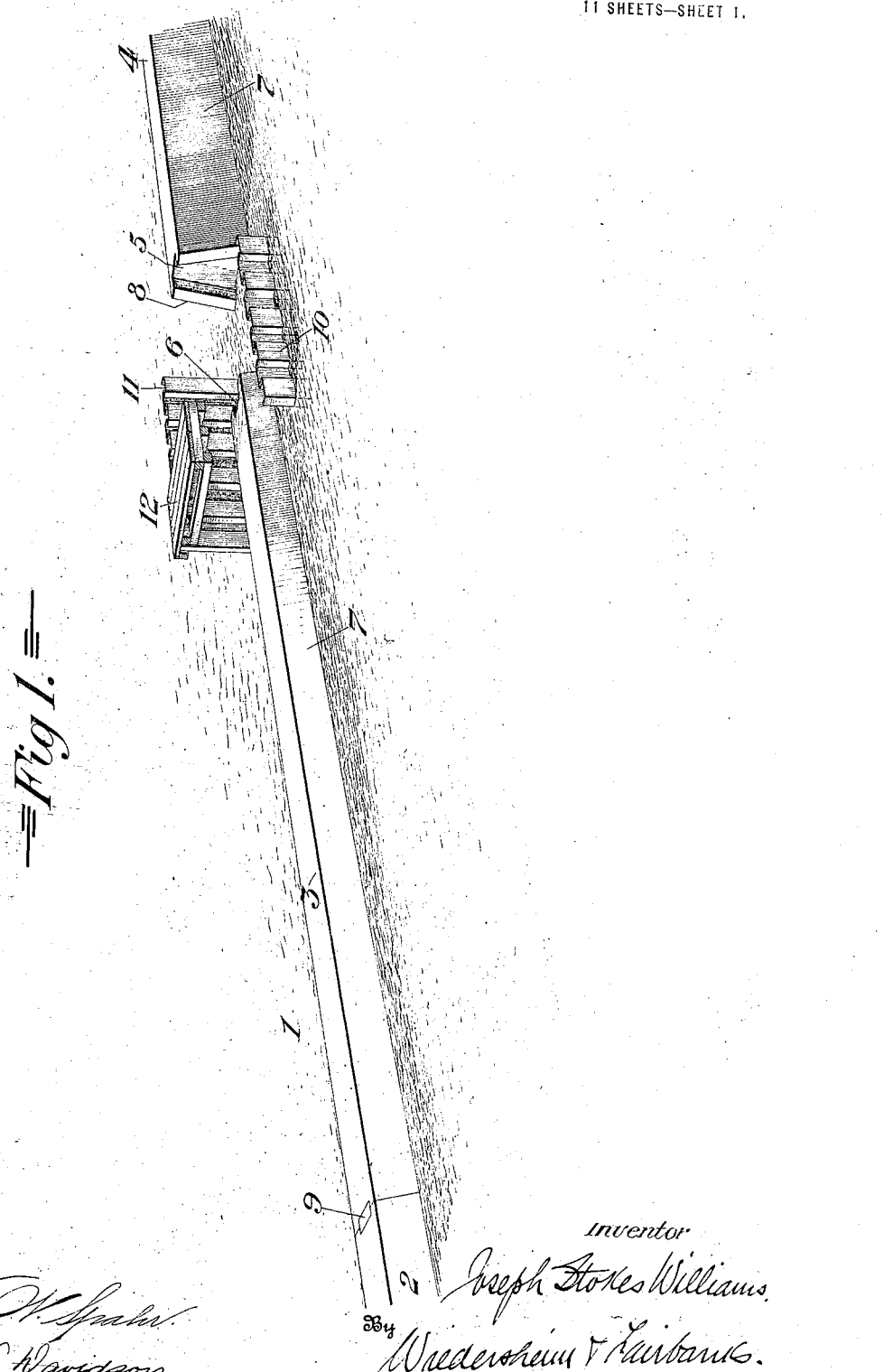

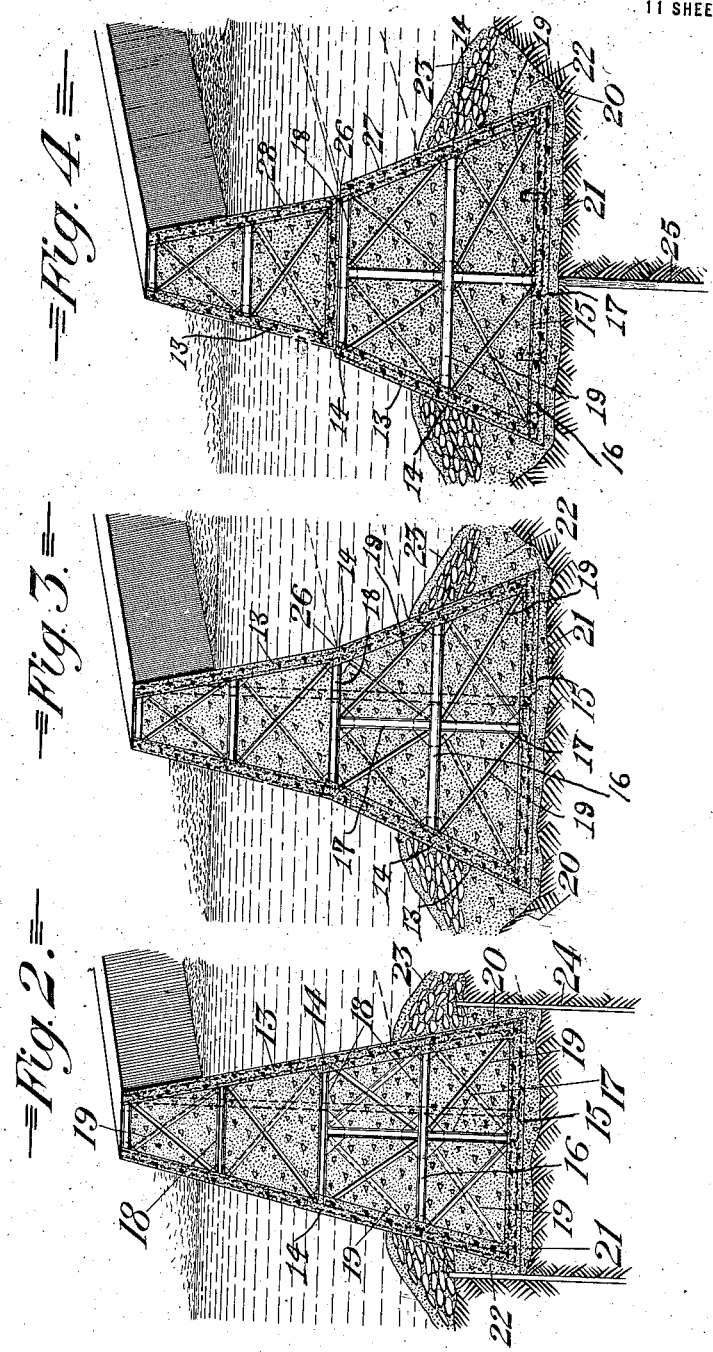

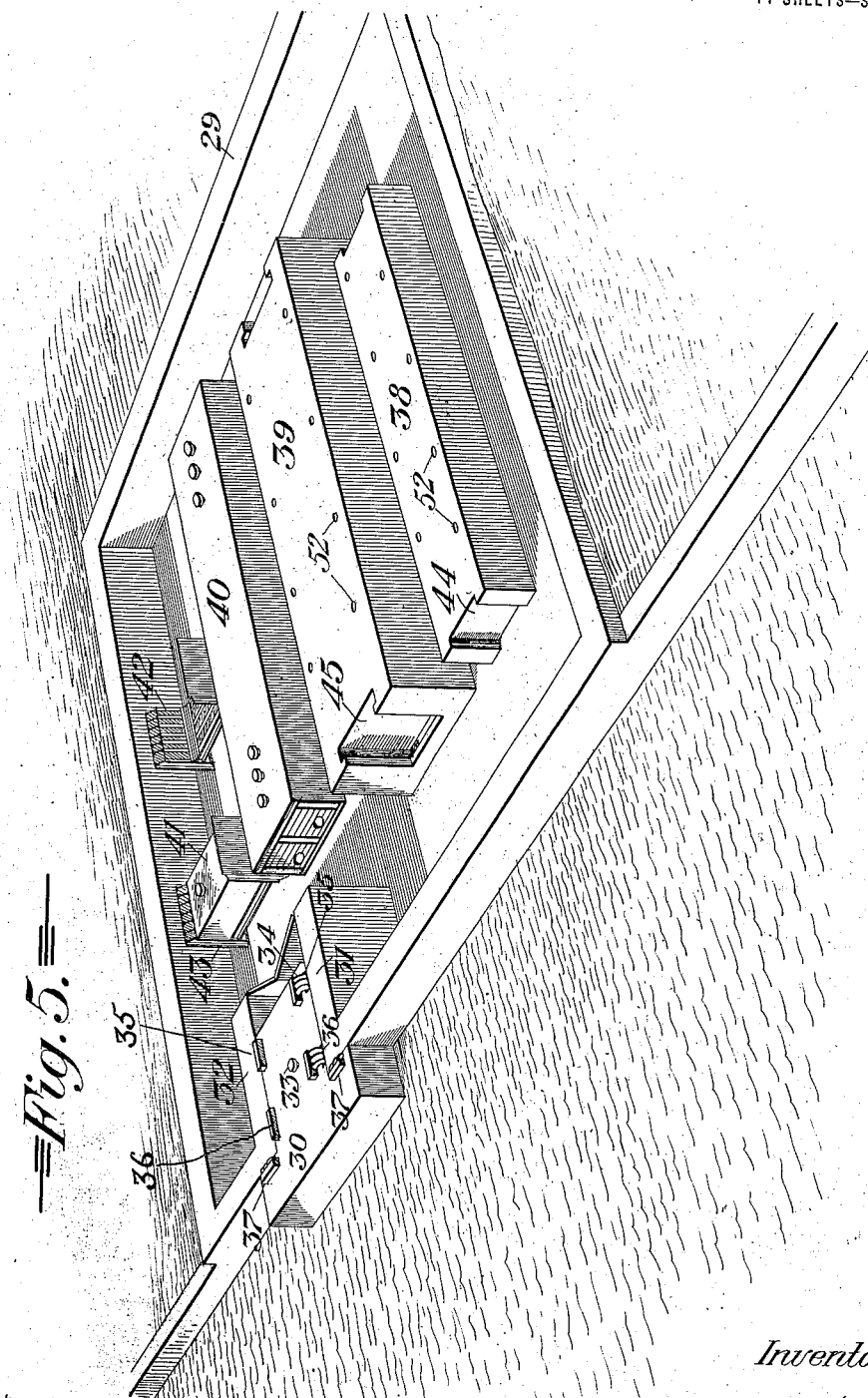

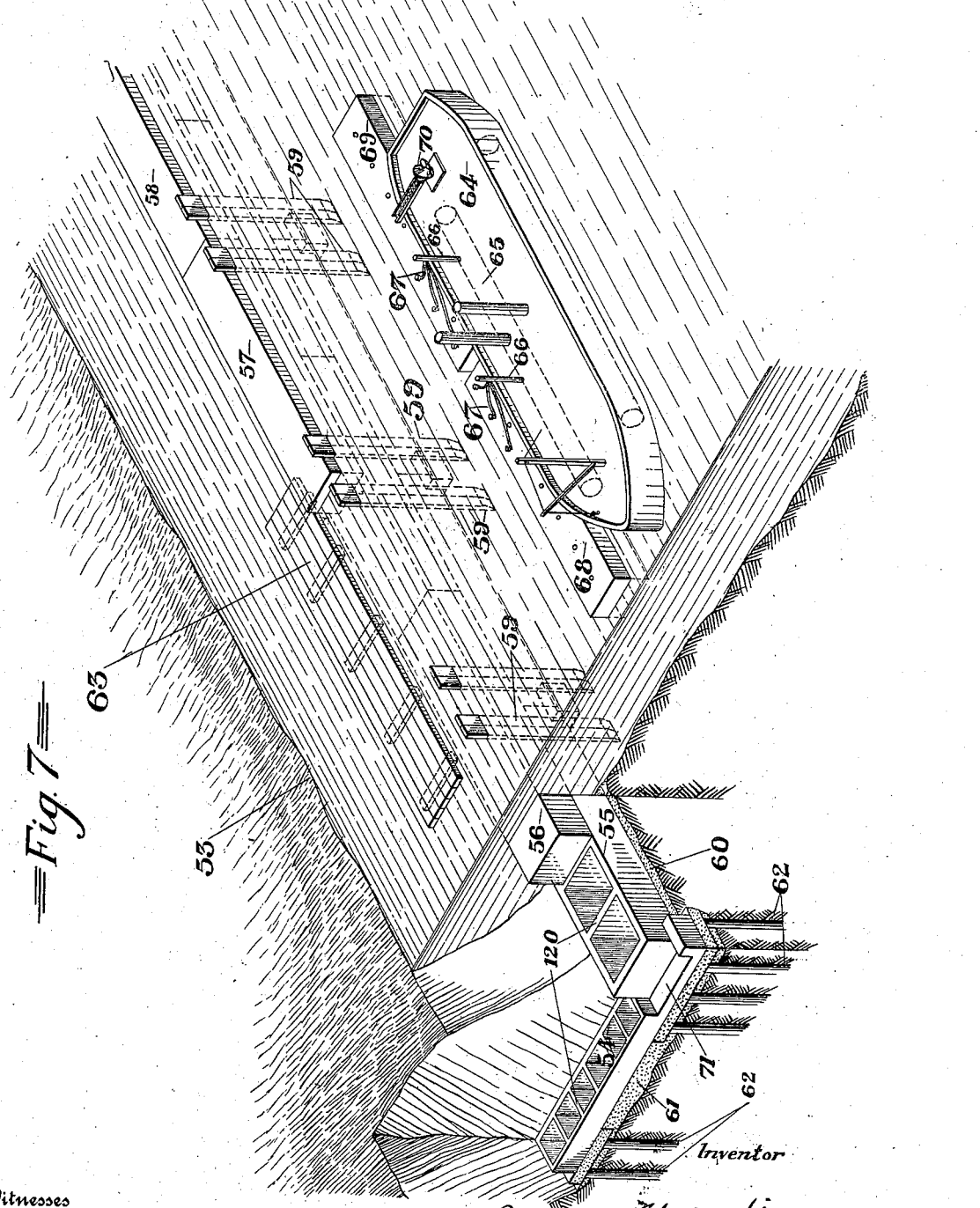

J. S. WILLIAMS.
FLOATABLE CONCRETE CONSTRUCTION.
APPLICATION FILED MAR. 3, 1909.
1,310,461.
Patented July 22, 1919.
11 SHEETS—SHEET 6.
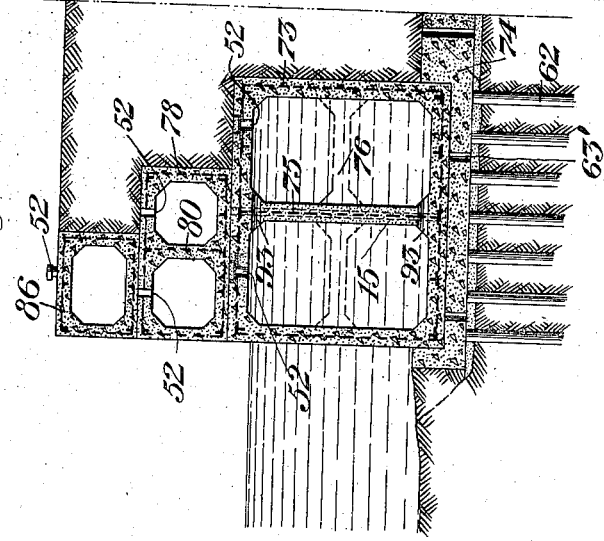
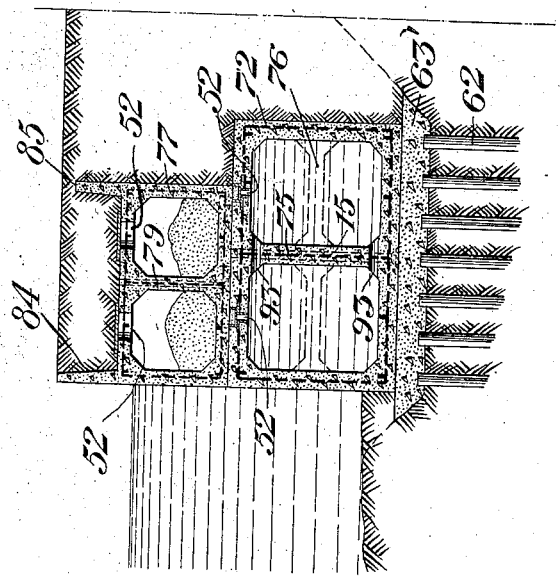

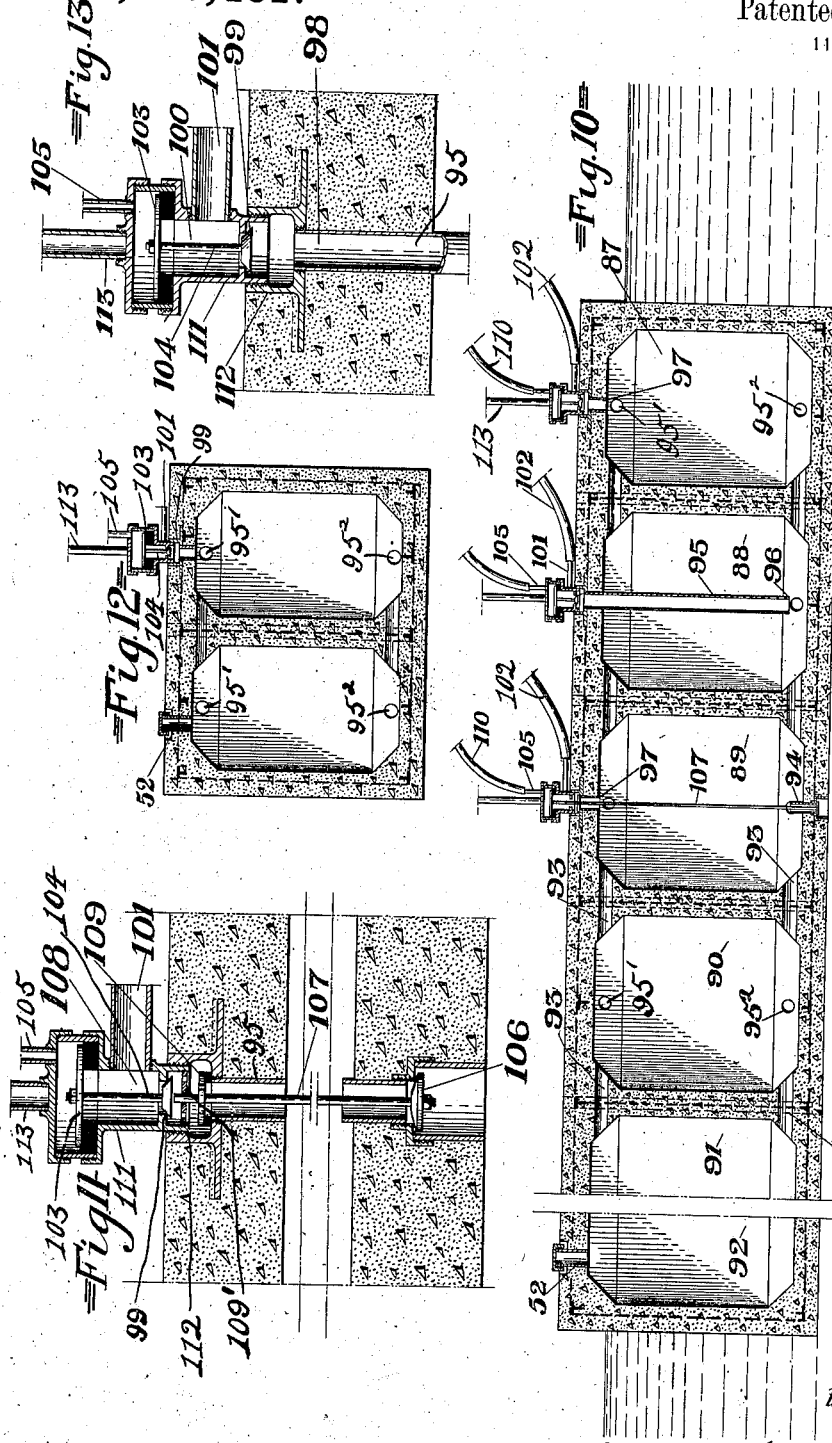

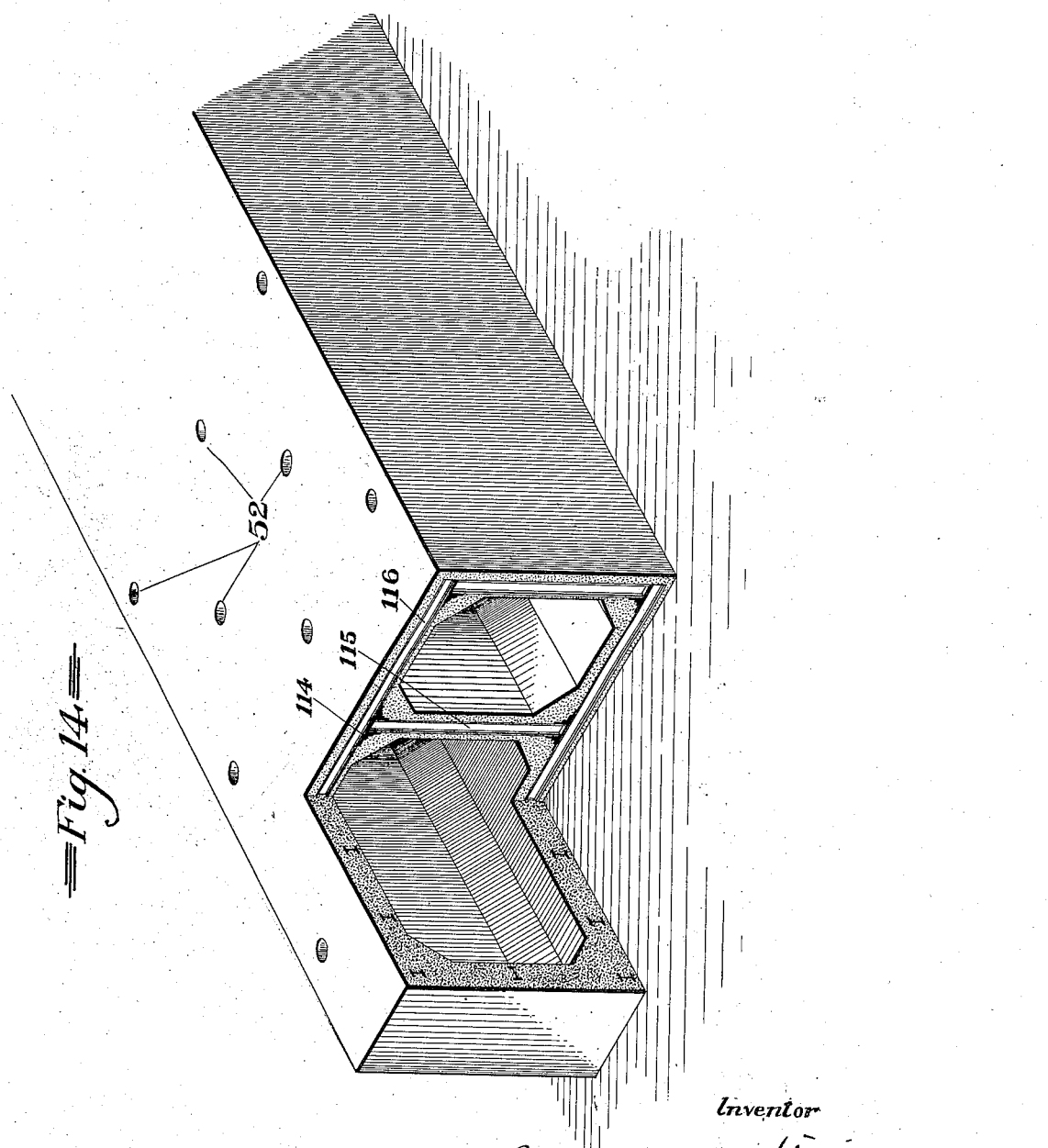

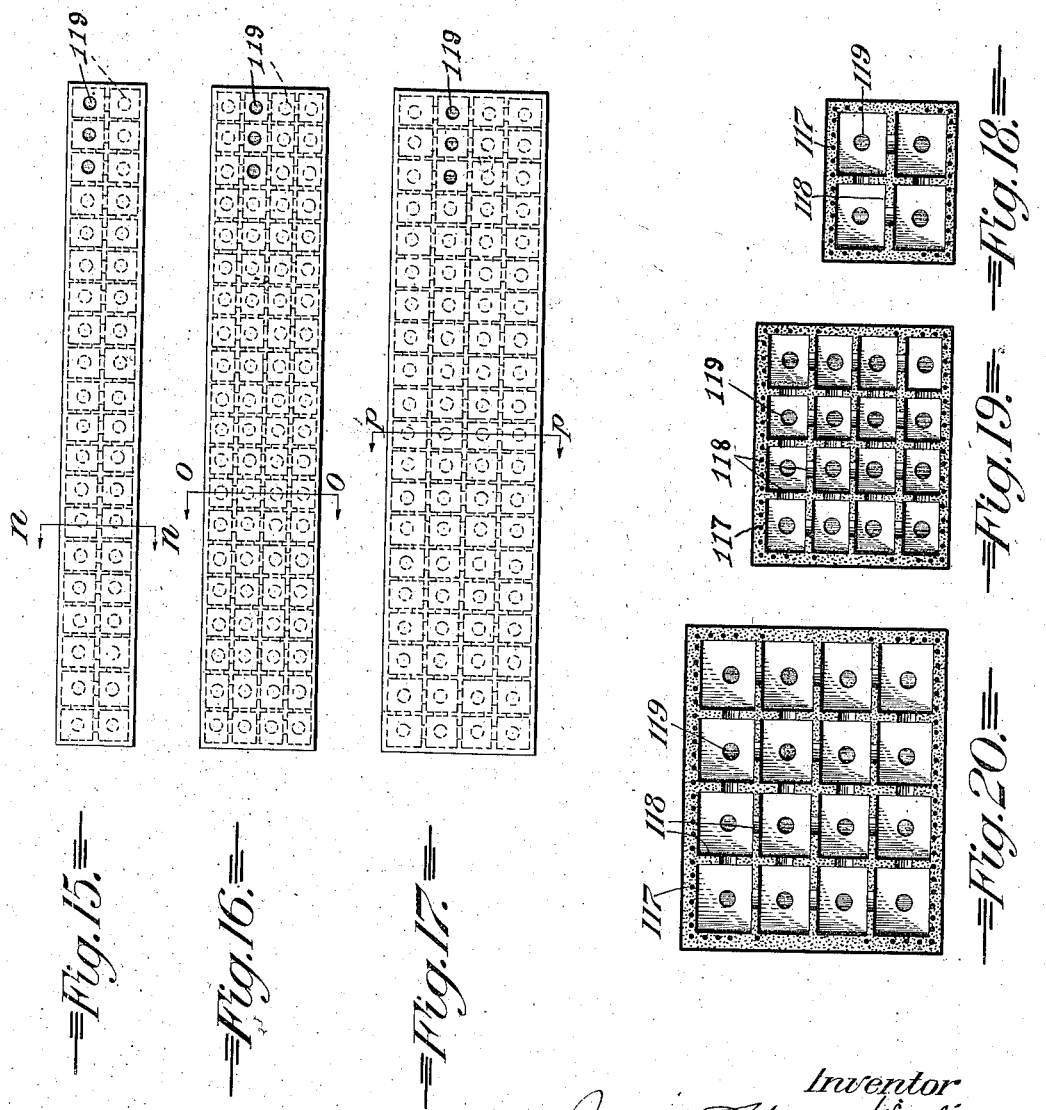

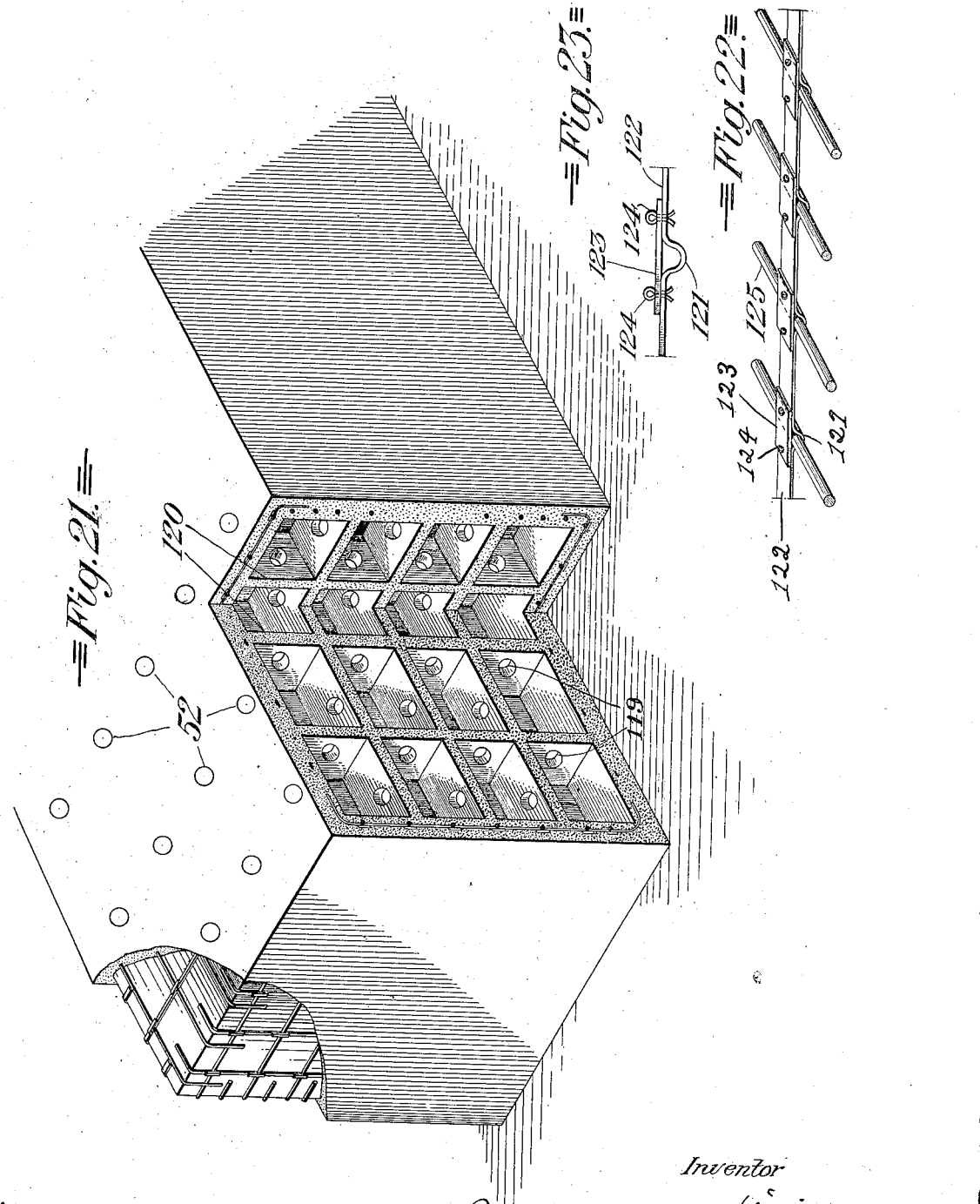

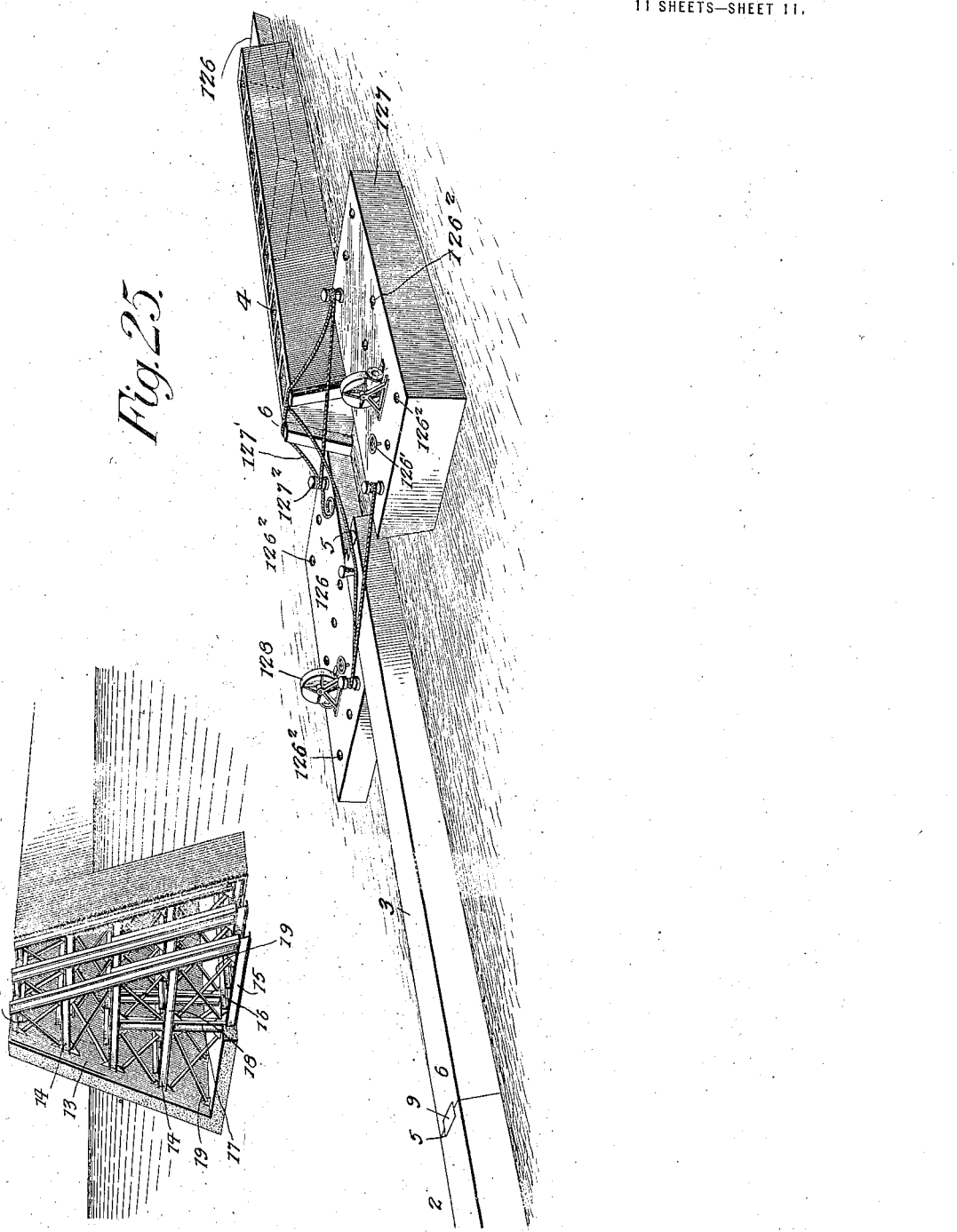

UNITED STATES PATENT OFFICE.

JOSEPH STOKES WILLIAMS, OF RIVERTON, NEW JERSEY.

FLOATABLE CONCRETE CONSTRUCTION.

1,310,461.  Specification of Letters Patent.  Patented July 22, 1919.

Application filed March 3, 1909. Serial No. 481,071.

*To all whom it may concern:*

Be it known that I, JOSEPH STOKES WILLIAMS, of Riverton, county of Burlington, State of New Jersey, have invented a new and useful Floatable Concrete Construction, of which the following is a specification.

The purpose of my invention is to provide a method and mechanism of and for constructing conveying and placing in suitable alinement floatable concrete structures. A further purpose of my invention consists in ballasting floatable concrete constructions into union with the bed.

With the above and other purposes in view, which will hereinafter appear in the detailed description, my invention consists of a novel method and mechanism of and for constructing and placing in position concrete construction in and about waterways. It further consists of other novel features of construction, all as will be hereinafter fully described.

For the purpose of illustrating my invention, I have shown in the accompanying drawings, some forms thereof which are preferred by me, because of their evident practical value and because they have been determined to be reliable and satisfactory, although it is to be understood that the various instrumentalities of which my invention consists can be arranged and organized in great variety and that my invention is not limited to the structure or method which I have illustrated and described but is capable of much broader use.

Figure 1 is a perspective view of a structure embodying my invention.

Figs. 2, 3 and 4 are perspective views partly in transverse section showing different forms of wall of the character shown in Fig. 1.

Fig. 5 is a perspective view of a plant for erection and flotation of floatable structures.

Fig. 6 is a perspective view partly broken showing a pier in process of erection.

Fig. 7 is a perspective partly in elevation showing a method and apparatus for establishing levee wall construction.

Figs. 8 and 9 are transverse sections of different forms of levee wall construction.

Figs. 10, 11, 12 and 13 are sectional views of floatable concrete constructions illustrating the methods and means of varying the flotation thereof, Fig. 14 is a perspective partly in section of a form of floatable concrete construction showing the reinforcement thereof.

Figs. 15, 16 and 17 are top plan views of floatable cellular sections intended for wall step formation though capable of independent use.

Figs. 18, 19, and 20 are transverse sections of Figs. 15, 16 and 17 respectively upon their several section lines *n—n*, *o—o*, and *p—p*.

Fig. 21 is a perspective partly broken and partly in section showing a form of cellular floatable concrete wall construction, and the bonding thereof.

Fig. 22 is a detail perspective of a portion of the bonding in Fig. 21.

Fig. 23 is a detail side elevation of a portion of a bonding structure seen in Figs. 21 and 22.

Figs. 24 and 25 are perspectives of wall frames and floatable docking, alining and molding means respectively.

Similar numerals of reference indicate corresponding parts in the figures.

Referring to the drawings.

My invention is intended primarily for large constructions of walls, dykes, bulkheads, levee walls, piers, wharves, and such like water way constructions of which a part of each at least lies beneath the surface of the water or may be brought beneath the surface for purpose of construction. Any cap top or finish may be placed upon or supported by this structure or formed with or combined with it and where this is not prohibitive by heights, size and existent conditions, may equally be floated to place therewith.

While I have not considered it necessary to specify reinforcement in connection with the various references to concrete in the introductory and descriptive matter hereof and in the claims in all cases, I recognize that in the larger structures such reinforcement may be essential, and even in smaller structures of the character shown and described such reinforcement will ordinarily be desirable and beneficial. The necessity for reinforcement of the concrete or the permissibility of omitting the reinforcement must be determined in each instance by the circumstances and conditions and character of the work to be established, I wish therefore to be understood in my use of the term concrete as including the reinforcement thereof where this is essential or sufficiently desirable to cause its use without necessity for separate reference thereto since concrete is none the less such when it is reinforced.

1 designates a wall which I have shown in Fig. 1 as laid in two sections 2 and 3 with a third section 4 floated in proximity thereto and nearly ready to be sunk into alined position therewith. The ends of the sections in this construction are provided with mating grooves 5 and 6 which are here shown tapered in correspondence with the tapering of the sides 7 and 8 of the sections. After the sections have been sunk to place they are united to join them into continuity of structure by filling the space between the ends with concrete as at 9.

For protective purposes as well as for guiding and alining the sections during the process of locating them I have illustrated piling 10, 11 which is shown of sheet metal type. This function can evidently be performed in a great variety of ways and readily by means of a floatable and sinkable vessel. The proper preparation of the foundation reduces the amount of care and labor incident to the alinement to a minimum. Methods and apparatus for alining and constructing beds and foundations such as might be used with these floating sections are shown described and claimed in a companion case filed of even date herewith Serial No. 481,070, filed March 3rd, 1909. The method and construction shown in this companion case would also be fully effective to complete the union of adjoining sections whether the space be filled were that merely within an end opening as at 9 or a considerable gap between the section.

I have shown a working platform at 12 which can be adjusted to any position along the piling and which can be made to perform the additional function of carrying a marker or guide, or guiding member for the section, or sections which are being located. The sections are constructed separately in suitable place and manner of which I have given illustration and description as to one or more forms elsewhere herein, and are launched or floated and towed, or otherwise conveyed to the approximate final location where they are sunk preferably by allowing water to flow into them. Care is taken to aline them properly, so that when sunk they rest in the precise locations intended. However, I have elsewhere shown means for refloating, or releasing the sections from their positions to provide for correction in placing, or other need for change. After adjoining sections are placed the space in between is preferably filled to complete their union and the sections themselves may be filled with concrete where desired. I prefer to fill the type of section indicated in Fig. 1 with concrete and such filling may be necessary or desirable in a great variety of forms to add stability particularly where current and wind pressures are to be guarded against. The filling with concrete is also quite desirable to support the reinforcement within the section.

I also prefer to reinforce the bed or foundation upon which the section is placed and illustrate several forms of reinforcement in various figures, particularly in Figs. 2, 3, 4, 8 and 9, though I of course recognize, and mere inspection will make evident that these are but a few of the many means of reinforcement which may be made use of with or without preliminary dredging, or other excavation.

In Figs. 2, 3 and 4 I have shown a very desirable and effective form of reinforcement for the concrete consisting of a frame work whose sides and bottom are embedded in the concrete to form a water resistant casing with or without additional water proofing therefor.

Each of the sides of this frame work is composed of suitable upwardly extending and longitudinally extending structural shapes 13 and 14 respectively which are rigidly fastened together and the rigid structure so formed is secured to the framing members of the base. The base is made up of horizontal members 15 and longitudinal members 16 to form a complete union between the sides and to provide suitable reinforcement for the bottom as will also be understood by reference to Fig. 24.

I have also shown a centrally disposed vertical member 17 which I have extended through approximately half the height but whose use and height will depend of course upon the size and proportion of parts in the particular section. A plurality of these can be used where required. I have shown this vertical member 17 as directly connected with the side structures by means of the transverse shapes 18, which shapes may of course be used between the sides above the vertical member or where this vertical member is omitted. I have so shown them above the vertical member.

I also make use of diagonal truss, or brace members 19 which I unite to the sides and to the horizontal and vertical members in such a way as to give effective stability to the framing and to the walls of the floatable structure.

In Figs. 2, 3 and 4 I have shown the bed as channeled or otherwise dredged, or prepared at 20 to give an approximately even surface and firm foundation and have further united the sections in concrete at 21 and have filled the channeled space with concrete as at 22 after the sections have been placed. I have also heaped this concrete up about the sides as at 23, illustrating a coarser form of concrete for this use. I thus not only prepare a firm, solid and uniform base for the reception of the sections but additionally anchor them by the surrounding concrete making the entire width of this concrete effective as a base for the sections.

I have shown protection for the bed or foundation against undermining or shifting thereof by means of sheet piling 24 which in Fig. 2 is shown as extending from the surface of the original bed down below the bottom of the channel formed and to any desired distance. In Fig. 4 a single central line of such piling is shown.

Each of the forms shown in Figs. 2, 3 and 4 is illustrated as filled with concrete subsequent to the sinking thereof. I prefer to fill them through the top leaving the latter open in the initial construction and finishing it with concrete after the interior has been filled to the height required. In Fig. 8 I have shown the sections as but partially so filled. Evidently the extent of filling required or desired will vary with the conditions met with.

In Fig. 2 I have shown the sides as sloping uniformly from the bottom to the top. Evidently this may not in all cases be desirable and the center of gravity can of course be considerably lowered at the same time that the width of the base is correspondingly extended by a structure such as shown in Figs. 3 and 4 where the taper is changed at 26, the upper portions of the sides being more nearly vertical than the lower portions.

In Fig. 4 I have shown the wall as made up of two independent sections 27 and 28 each separately floated to position and sunk to place. The lower section forms a complete foundation for the upper section. The latter must of course have sufficient weight and stability to stand upon the lower section in such case without necessity for bonding in between though such bonding would of course be easily accomplished by any well known means, either external or internal with proper provision if internal for avoiding undue admission of water to the section thereby until it has been sunk to place.

In each of Figs. 2, 3 and 4 the wall is shown as extending above the surface of the water. This is not in any way necessary to the construction, the height being dependent entirely upon the requirements of the particular use and location. For example, the wall in Fig. 4 might be complete for the purpose intended with the lower section only in place, and in any of these structures the width of top could be made sufficient to accommodate any desired superstructure whose height or weight would overcome the buoyancy of the floatable section or sections.

In Fig. 5 I have shown means for protecting casings or sections during their manufacture and launching them in the provision of a dry-dock 29 having a floatable gate 30 capable of being sunk to place between the walls 31 and 32 by admission of water thereto through any suitable valve controlled as at 33 and of reflotation by pumping the water out of the same.

I provide a seal for this gate by means of one or more tubes or sets of tubes 34 which I prefer to pass entirely around the gate and which I inflate by means of interior fluid pressure by gas, water or other fluid pumped therein by any suitable means and to any desired pressure. The tubes themselves can be made of any material suitable for so sealing the surface against which they rest and preferably capable of compression to add its elasticity as a sealing factor. I have shown these tubes as arranged in three sets of three each, two sets being shown upon the sides at 35 and 36, and the third at the end at 37. The inward pressure of the water would of course hold this latter to its duty.

Within the dry-dock I have shown floatable structures 38, 39, 40 and 41 and cradles 42 and 43. These cradles are intended for the use with beds as shown at 43 where 41 is supported and for general alinement purposes.

In sections 38 and 39 I provide recesses 44 and 45 whereby the sections are locked to adjoining sections against lateral movement and in the case of 45 against longitudinal movement also. The adjoining section may be tongued to fit within the groove shown or may be correspondingly grooved to provide for concrete union between them.

The size of the dock would of course be proportioned to the size and number of sections required of it for each launching after which it would be pumped out of course in the usual manner by pumps which I have not considered it necessary to illustrate.

In Fig. 6 I have shown a bulkhead 46 adjoining which the dock 47 is to be placed, this dock being of the general construction shown at 39 in Fig. 5 as there constructed but not yet launched. I have illustrated the line of piling at 48 upon each side of the position to be occupied by this wharf and have shown also a facing 49 upon the inner side of each line of piling. The wharf is floated to place with or without preliminary dredging as at 50 and is then sunk by means of valves 51. The bed may be reinforced and supported by ballast forced down through the ballast port or ports 52 and other sections as of wharf or tunnel may be connected to the section 47 making the joint through groove 45, In Fig. 7 I show a shore line 53 which is to be supported or protected by walls of any suitable character comprising levee walls, coffer-dams, etc., and illustrate section 54 of coffer-dam and sections 55, 56 of levee wall in place with sections 57 and 58 also placed further up along the wall and resting upon sections which are shown in dotted lines. I have here made use of guides 59 to conveniently determine the outside position of the several wall sections. The several sections are here laid in layers the joints of one layer breaking with the joints of the adjoining layer. I have illustrated a concrete foundation 60, 61 resting in part upon piles 62.

In the placing of the sections I make use of a combined floatable working platform and guides 63 which can be sunk and refloated wholly or to any desired degree, and of a tug 64 provided with air pressure tank 65 here connected by tubes 66, 67 with the sections 68 and 69 and with concrete mixing and feeding apparatus 70. The valve equipment and connections, as shown in Figs. 10, 11, 12 and 13, are adapted for use in the equipment of the combined platform and guide 63, for operation in conjunction with the vessel 64 and its equipments, so as to change the ballast in 63 as required for the purpose of alinement and concrete construction.

The groove 71 of the coffer-dam section 54 with which section 55 of the levee wall combines with the ends of wall 54 forms a convenient and secure means of bonding between these sections. These sections in common with all of the sections shown by me in this application can be filled to any desired extent with concrete after being sunk to place and to unite the same.

In Figs. 8 and 9 I have shown rectangular sections 72 and 73 as the basic sections resting upon piles 62 and concrete 63' thereon within a dredged channel providing in the one place an alining cradle 74 as in Fig. 9. The rectangular sections shown have vertical reinforcements 75 and horizontal reinforcement 76 and themselves form supports for rectangular sections 77 and 78 which I have shown as likewise vertically reinforced at 79 and 80. The sections 72 and 77 of the one construction and 73 of the other are provided with openings 52 through which the ballast of water can be pumped for reflotation and through which or by other ports concrete can be inserted as desired.

Upon the section 77, I form boundary walls 84, 85 which have some of the advantages of an additional section or height of section but providing earth filling therefor; and upon the section 78 I superpose another rectangular section 86.

It will be noted that in Figs. 8 and 9 I have a stepped formation conforming to or made to conform to the bank at that side with a vertical outside wall and that in Fig. 8 the section 77 is readily floatable to place with the height of the water shown, conforming to the requirements where there is but slight variation in the water's height. In Fig. 9 the sections 78 and 86 are shown as wholly above the height of water there and could of coure not be floated to place unless advantage be taken of a condition of high water for that purpose. This could be done or the sections could be independently constructed in place.

In Figs. 10–13 I have shown mechanism for the control of the sections shown to sink and refloat the same. In Fig. 10 I have shown a sectional construction comprising sections 87, 88, 89, 90, 91 and 92 intended in this instance however, to be constructed integrally and therefore to provide a cellular construction and I have further shown these cells as connected top and bottom by means of passages 93, whereby a single valve 94 is made to answer for admission of the water to all of the cells.

The cellular construction offers considerable advantage in reinforcement and this construction can be used whether or not the cells are connected or independent as separate provision for letting water into or removing it from each cell can be provided readily and the cells can likewise be independently filled with concrete if desired.

The cells shown in section in Fig. 10 and constituting a row there may be the only such cells of this structure or may constitute one only of a number of rows of cells with openings 93 at top and bottom if desired into these other cells. A series of rows of slightly different cells is shown in Figs. 15, 16 and 17 where the number of rows both vertically and horizontally differs, being two in Fig. 15 and four in each of the other figures. I have not deemed it necessary to show the means of insertion or removal of water ballast in these Figs. 15, 16, 17 and the sections thereof.

In order to remove the water from the sections or from any of my construction I may make use of any suitable pump. I have, however, provided a special form of this pump or connection thereof in order to be able to control it from the surface even after the construction has been sunk. This construction also permits the exhaust of the air and would of course be suitable for filling the sections with water from the surface instead of the use of the valve 94.

I provide a pipe 95 extending nearly to the bottom of the structure for the purpose of water removal, or it can stop at the top thereof within the chamber as at 96 and 97, respectively, for introducing air and varying pressures thereof though both of these forms permit water to be inserted from above the pipe as shown with a passage 98 and a valve and valve seat at 99, located in a space 100 to which pipe 101 is connected. The valve in the position shown in Fig. 13 will be moved by the fluid pressure on the upper face of the disk 103, so that air will pass freely out or in from the pipe 101, as may be desired, and water may be forced in or additional air pressure supplied through the same pipe with which I have shown the tube 102 as connected. By releasing the pressure on 103 through the medium of 105, any air pressure within the section is made effective upon the under-side of the disk 103 to close the valve 99 but this disk 103 which is connected by means of rod 104 with the valve 99 can be forced down by means of air pressure within the pipe 105 from the source of supply above the surface of the water or by means of the air pressure within the chamber. The air pressure within the concrete section is available for this purpose with suitable connection because the area of the upper side of the disk 103, which is exposed to this air pressure through pipe 105, is greater than the surface of the disk which is exposed to pressure of air from within the section.

In the construction shown in Fig. 11 the valve 106 is shown combined with the valve 109 in the upper part of the construction by means of a rod 107 so that both valves will be ready to be closed by the pressure of water from outside and by pressure of air from the inside of the construction upon the under side of the valve 109. The valve 109 is shown with the member 109' extending into proximity to the valve 99 which latter is connected with the disk member 103 by rod 104 extending through the chamber 108, the latter having an outlet or supply channel 101, as seen in Figs. 10, 12 and 13, and provided with a controlling channel in connection with 105 leading to a fluid top chamber on the upper side of the disk member 103, and provided with an upwardly projecting rod 113 for extent above the water. The connections 101 and 105 are adapted to be extended by means of conduits 102 and 110, respectively, to operative position above the water for connection with suitable means, whereby compressed air can be passed into channel 110 to operate upon the upper side of the disk member 103, and thereby upon the valve 99 and also the valve 109 and 106 and thus provide for the air to escape through the channel 101 and for the water entering at 106 and otherwise for compressed air being forced through 101 to force water out at 106, as may be required in operating, for ballasting, alinement and locating the construction and for developing pressure. All of such operations are under absolute control by means of such mechanism and the controlling channel 110 and means operating therewith, as provided for in the equipment shown in Fig. 7, where air or other motive fluid is provided under suitable operative pressure. By such means floatable construction of any desired dimension can be readily and safely transported and handled, and pressures can be provided and maintained in transportation thereof, to secure flotation, resist leakage and so that flotation is varied for manipulation.

The valve mechanism illustrated in Figs. 10, 11, 12 and 13 is adapted to be detached when the construction is sunk into place by unscrewing member 111 from the socket 112 by proper manipulation of the member 113 which is designed to extend or to be extended so as to operate above the surface of the water when the construction is placed. It will be apparent that the member 111 can be unscrewed by means of any suitable wrench or tool coöperating with 113 or any other desired part of the mechanism.

It will be evident that such means are provided for the control of the admission of water, or air to my sections and of withdrawal of water therefrom all fully within the control of the operator from the surface of the water whatever the depth of the section beneath that surface.

In the form shown in Fig. 14 I make use of reinforcement for the concrete by vertical and transverse structural shapes of any suitable character there shown as I beams which are secured together and into one rigid frame work by means of longitudinal chords 114 to which the shapes 115 and 116 are united. Trussing by means of diagonal members can be freely applied to this form confining the trusses preferably within longitudinal planes.

In Figs. 15-20 I have shown longitudinal reinforcing bars or rods 117 and vertical and transverse reinforcements by means of the walls or partitions which form a cellular construction, and these walls I have numbered 118, and I have shown passages 119 through these partitions, said passages being permissibly small if water only is to be used for ballasting purposes, but relatively large if concrete is to flow from one to another of these sections or cells. The several widths of completed section there illustrated correspond approximately to the sections made use of in Fig. 9 though the cellular formation is quite different.

I have shown in Fig. 21 passages 119 between the cells formed by the partition 120 as some means of permitting water to penetrate them would be necessary for water sinkage thereof. I have made use of bonding in the external walls only, as is the case, indeed, in Figs. 18–20, and have combined strips and rods as best seen in Figs. 22 and 23. Both the strips and rods are passed substantially around the section, preferably, or at least through such a portion thereof as to leave no considerable section thereof without continuous bonding and the joints between the strips and rods are formed by means of loops 121 in the strips 122 with plates 123 closing the loops and held in place by any suitable means such as by split pins 124. The rods 125 pass through these loops and are thus retained therein.

Fig. 24 shows one form of construction of the reinforcement as will be understood by reference to Figs. 2, 3 and 4. Of course this reinforcement could be varied both as to the structural shapes made use of and as to their arrangement without departing from my invention.

In Fig. 25 I have shown floatable and sinkable molding or forming vessels 126, 127 acting also as guides. One of them, 126 is in this illustration sunk at the juncture of two sections of which one section 3 has been set in place. The former, aliner or mold 126 which for convenience I will call a mold, here acts as a guide to the second section which is being floated and sunk to position and which is shown at 4 as projecting considerably above the other section in the figure. The other aliner or mold, 127 is held in position maintaining the second section in contact with member 126; the position of contact being maintained as the section is sunk by means of ropes 127' and posts 127² or windlasses represented at 128, so that the section 4 being sunk is guided down to place along the edge of mold 126. It will also be evident that member 127 can be sunk to position when the second section has been placed and that any gap between the two sections which it may be desirable to leave for completion after the setting of the sections can then be filled in as at 9 between the two members or formers 126, 127 which constitute in this case guides, molds and working platforms for the construction desired.

The members or formers 126, 127 could also be moved continuously or at intervals in the direction parallel to the length of the wall to be formed and sunk to any desired proximity to the bed, the concrete being put in at the leading or advanced ends of the members or formers 126 and 127 preferably between them far enough from the end to prevent it from spreading outside of the proposed line of wall, except at the bottom where it will of course spread slightly and permissibly into the space between the bottom of the molds or formers and the bed, thus additionally anchoring the wall. Any desired means of spacing the formers or molds 126 and 127 during this use could be applied as by means of bars or braces between them at the leading end and at or over the top of the wall at the trailing end initially, the spacing at the trailing end being assisted and in part maintained by the set concrete forming the wall itself. The speed of progress in forming the wall would of course have to be sufficiently slow for the concrete to have set before it left the trailing edges of the mold or former surfaces. That portion of these surfaces between the point at which the concrete was inserted and the trailing edges acts both as a retaining means for the concrete before it is set and as a smoother or finisher for the surface during the setting operation.

In carrying out this method of wall construction by means of molds or formers it may be necessary to guide the progress of the spaced molds, or formers which can readily be done by piles altogether, or by piles initially and the set portion of the concrete wall between the formers or molds afterward. Where this latter means is depended upon largely or partially for the guiding after a portion of the wall has been constructed the angle of application of the force by which the molds or formers are advanced can be used to correct any tendency toward deviation from the line intended.

I prefer to advance the molds or formers 126 and 127 either by tension devices from relatively fixed points, by application of force, as for example jacks from behind or by tugs, easing up the surfaces toward the trailing edges where desired to avoid extensive friction against the set wall as by spacing slightly more toward these edges.

I have shown the floating platform and forming member with valve equipment 126' by which the water ballast may be varied for floating and sinking the members into alinement over the bed. Valve arrangements may be such as shown in Figs. 10, 11, 12 and 13 and they may be operated from air tanks, as shown and described with reference to Fig. 7, and floatable and sinkable construction and equipment as clearly described with reference to Figs. 10, 11, 12 and 13. The alining and forming members 126 and 127 are also shown provided with passageways or conduits 126², which extend from the working platforms of the formers to the bottoms, by or through which hydraulic or suction dredging can be effected to properly aline the bed and the forms 126 and 127 upon and into engagement with the bed, whereby the desired grade and placement thereon may be established longitudinally and horizontally into proper contact with the finished section 3, as well as the last placed section 4, so as to properly aline the wall construction and provide for confining the space at the ends of the sections 3 and 4 where they will be joined into a continuity of wall by the concrete filling 9 which may be to any desired length.

In case of establishing long lengths of fillings by means of the formers, the wall construction will be carried out with floatable sections 4 forming closures for the space confined, otherwise by the members 126 and 127 lapping the same when sunk at the end of the section 3, also lapped by the forms 126 and 127. In all cases of large construction even where reinforced concrete construction is mainly employed and is floated into place and sunk into alinement for walls, dykes, bulkheads and similar construction, or where masonry is to be established with alinement, the alining and forming members will be important factors in securing properly alined and completed construction.

Having thus described my invention, what I claim as new and desire to secure by Letters Patent, is:—

1. In a wall for use upon a subaqueous bed, a floatable form of concrete, a valve below the water line, and fluid actuated means at the top thereof for controlling said valve.

2. In a wall for use upon a subaqueous bed, a floatable form of concrete, a valve below the water line, means for forcing air under pressure therein, a second valve controlling the first valve, and means for moving the second valve against the air pressure.

3. In a wall for use upon a subaqueous bed, a water valve therein, a second valve controlling the water valve, and means for admitting air under pressure to each side of the second valve.

4. In a wall for use upon a subaqueous bed, a floatable form of concrete, a valve for admitting air or water thereto, a second valve for controlling the first valve, and means for operating the second valve.

5. In a wall for use upon a subaqueous bed, a floatable form of concrete, a valve for admitting air and water thereto, means for controlling said valve from the surface when the form is beneath the surface of the water, and the valve being adapted to be removed when the form is beneath the surface.

6. The method of constructing concrete walls upon subaqueous bases which consists in constructing a floatable wall section, floating it to approximate position, sinking it to alined position, floating a guide to approximate position and sinking it to alined position against this section, floating a second section to approximate position, and sinking it against the guide.

7. The method of constructing concrete walls upon subaqueous foundations which consists in constructing floatable wall sections, in floating them to approximate position and sinking them in alined position, and sinking floatable molds to position against the sections to determine the contour of the concrete joining the sections so set.

8. In combination a pair of floatable and sinkable concrete wall sections, means for sinking them, a plurality of floatable and sinkable molds or formers, and means for sinking them to place against the sections.

9. The method of constructing concrete walls upon subaqueous beds or foundations which consists in forming floatable and sinkable wall sections, conveying them to approximate position, sinking them to place, floating and sinking a guide and mold to guide one or both of them to alined position, and floating and sinking a second guide and mold upon the opposite side of the joint to be made from the first mold or guide, and in concreting the space between the ends of the sections.

10. In subaqueous concrete construction, a floatable and sinkable combined guide and mold.

11. In subaqueous concrete construction, a floatable and sinkable combined guide and working platform.

12. In subaqueous concrete construction, a floatable and sinkable combined guide, mold and working platform.

13. A hollow floatable section of reinforced concrete, means including floatable alining devices for placing it over the proposed bed, means for filling the section with concrete, and means for reinforcing the section upon the bed.

14. A hollow floatable section of reinforced concrete, means for towing it into position over a subaqueous bed, floatable devices for alining the section, means for sinking the section, and a concrete filling for the section.

15. A hollow floatable section of reinforced concrete, means for sinking it upon a bed, and floatable and sinkable means for maintaining the form in alined position.

16. A plurality of floatable sections of reinforced concrete, means, including floatable devices for chambering the meeting ends of the sections, to sink the sections, and a concrete bond between the adjacent ends of the sections.

17. The method of establishing concrete construction upon a subaqueous bed, which consists in bringing floatable sections of reinforced concrete in alined position above the bed and lapping the structures with floatable members having longitudinal length and vertical depth to conform to the completed concrete construction.

18. The method of establishing concrete construction upon a subaqueous bed, which consists in bringing floatable sections of reinforced concrete into position above the bed, alining the sections by floatable members having longitudinal length and vertical depth to conform to the completed construction, and defining the contour about the ends of the sections by the walls of the floatable members.

JOS. STOKES WILLIAMS.

Witnesses:
W. D. JACKSON,
C. D. McVAY.